Jan. 3, 1950     A. C. REECE     2,493,314
JAR LIFTER

Filed March 19, 1947     2 Sheets-Sheet 1

INVENTOR.
ASA CLAYTON REECE
BY J. Ledermann
ATTORNEY

Jan. 3, 1950     A. C. REECE     2,493,314
JAR LIFTER
Filed March 19, 1947     2 Sheets-Sheet 2
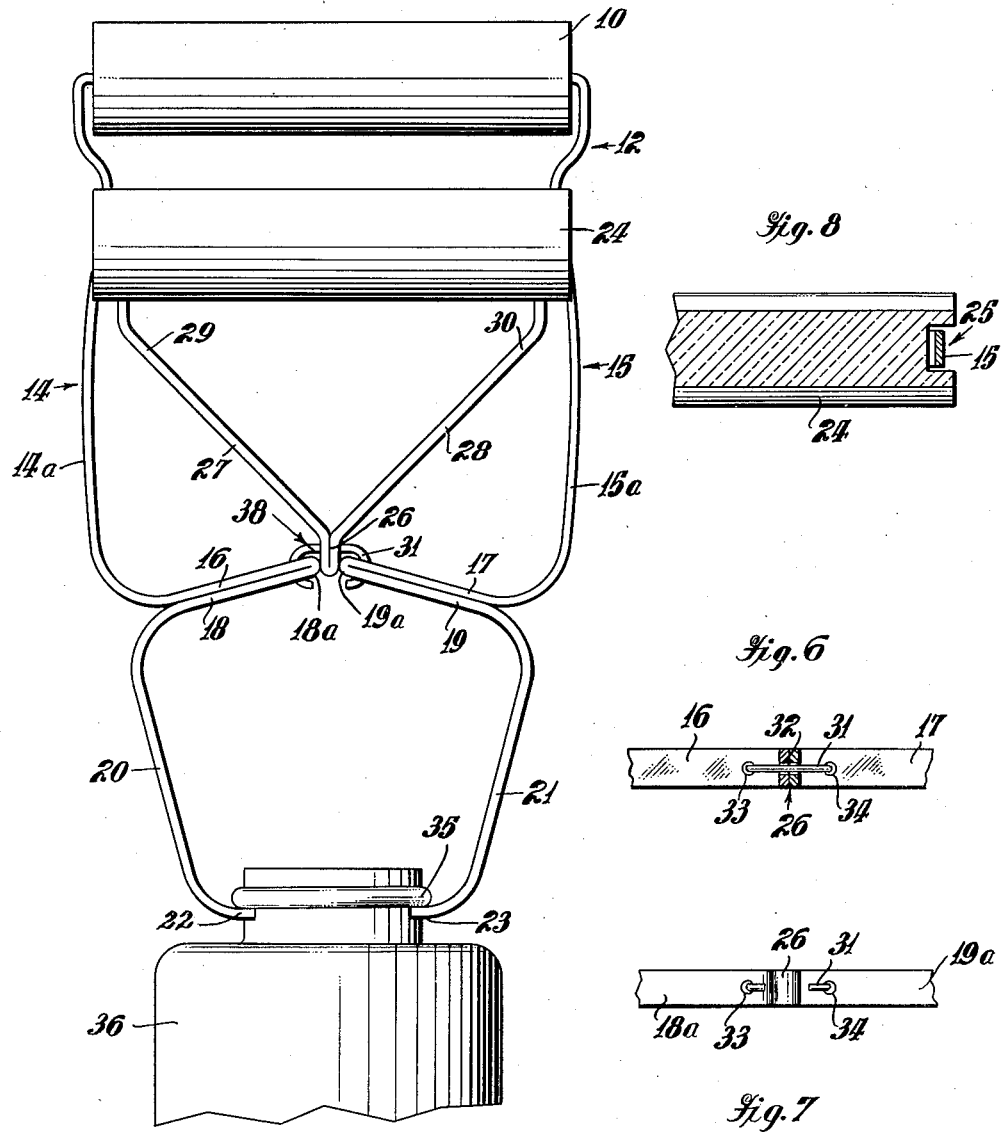
INVENTOR.
ASA CLAYTON REECE
BY J. Ledermann
ATTORNEY Patented Jan. 3, 1950

2,493,314

UNITED STATES PATENT OFFICE 2,493,314

JAR LIFTER

Asa Clayton Reece, Charleston, S. C.

Application March 19, 1947, Serial No. 735,748

2 Claims. (Cl. 294—33)

This invention relates generally to lifting implements, and aims primarily to provide a novel, useful, and practical lifter for jars, bottles, or the like, so that, for instance, a hot canning jar may be lifted out of the boiling water of the vessel in which it has been processed, without the attendant danger of scalding the hands of the user or the inconvenience of taking makeshift precautions to prevent such scalding.

Another object of the invention is the provision of a jar lifter which is simple in construction and operation as well as inexpensive in cost of manufacture.

Using the instant invention, a person may lift hot canning jars in a safe and secure manner from the heating vessel in order to place them on a table for cooling. The device grips a jar in a positive manner but it is impossible to tighten the grip to such an extent as to crack the jar by pressure of the jaws of the device because of the inherent resiliency of the structure of the invention.

The above broad as well as additional and more detailed objects will become apparent in the following description, wherein characters of reference refer to like-numbered parts in the accompanying drawings. It is to be noted that the drawings are intended for the purpose of illustration only and that it is neither desired nor intended to limit the invention to any or all of the specific details of construction shown, excepting insofar as they may be deemed essential to the invention.

Referring briefly to the drawing,

Fig. 6 is a fragmentary sectional view taken on the line 6—6 of Fig. 1.

Fig. 7 is a fragmentary sectional view taken on the line 7—7 of Fig. 1.

Fig. 8 is a fragmentary sectional view taken on the line 8—8 of Fig. 2.

Fig. 9 is a view similar to Fig. 1, showing the holder with the jaws thereof in closed condition, grasping a jar.

Figure 1:
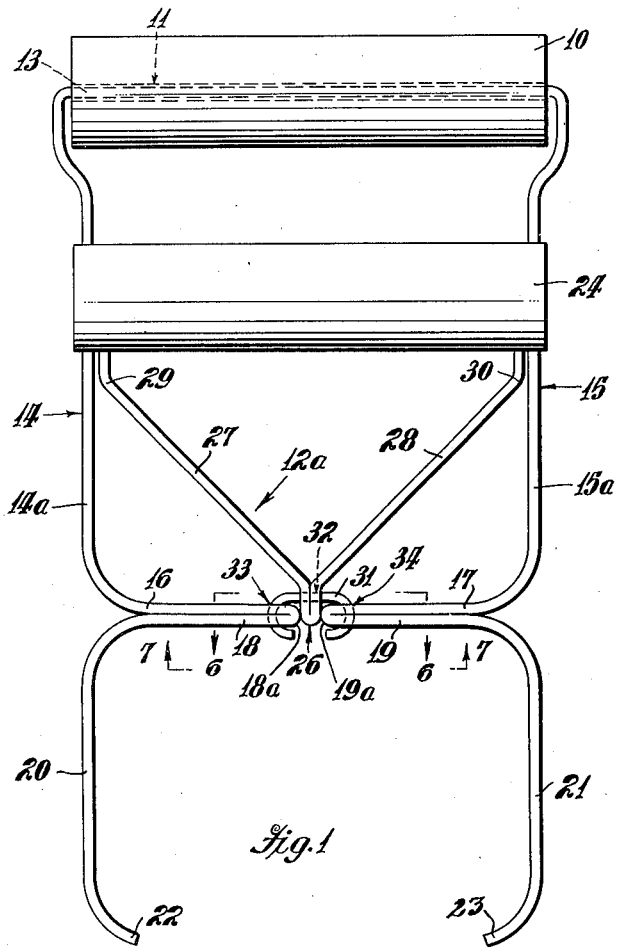
Fig. 1 is a side elevational view of the canning jar holder, showing the same in normal inoperative condition.
Figure 2:
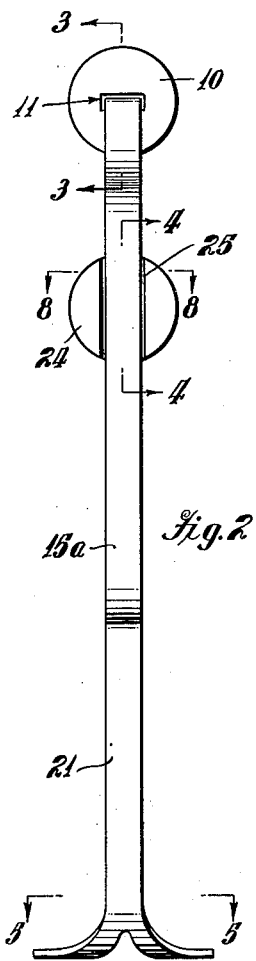
Fig. 2 is an end elevational view of the device.
Figure 4:
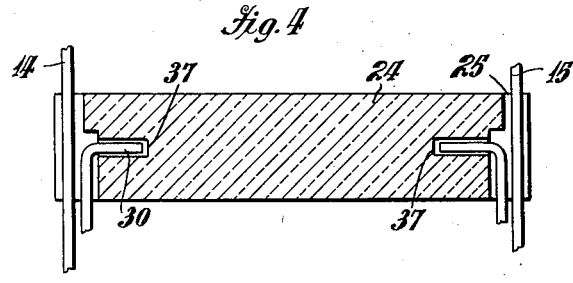
Fig. 4 is a sectional view taken on the line 4—4 of Fig. 2.
Figure 3:
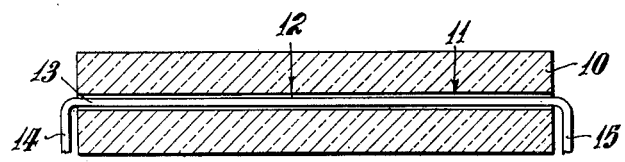
Fig. 3 is a sectional view taken on the line 3—3 of Fig. 2.
Figure 5:
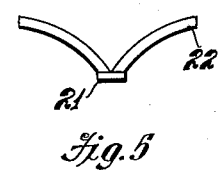
Fig. 5 is a sectional view taken on the line 5—5 of Fig. 2, through one of the two gripping arms of the device.

Referring in detail to the drawings, the numeral 10 indicates a cylindrical handle of suitable heat-insulating material such as, for instance, wood, not shown, or plastic material of which lucite may be cited as an example, which is provided with a longitudinal passage 11 therethrough. This passage is illustrated in Fig. 2 as having a substantially rectangular cross-section, but it may be of any other cross-sectional conformation, such as, for instance, circular, depending on the cross-section of the material of the main frame as hereinafter described.

As illustrated, the main frame 12 of the device is formed of a single length of a suitable material possessing a degree of resiliency such as, for example, a strip of resilient metal or a length of resilient wire, not shown. The main frame 12 constitutes a yoke also rectangular in cross-section, having a cross member 13 registering in the passage 11 of the handle 10 and having depending substantially parallel legs 14 and 15 at the extremities of the cross member 13. Substantially intermediate their height, the legs 14 and 15 are bent inward at substantially right angles, forming co-planar horizontal members 16 and 17. At a point approximately, but less than, midway between the legs 14 and 15, the legs are doubled back underneath as shown at the rounded folds 18a and 19a, respectively, thereby providing the members 18 and 19 flush against the bottoms of the members 16 and 17, respectively. Thus, a free space 38 is provided between the juxtaposed folds 18a and 19a. The lower portions of the legs 14 and 15 are then bent downward at right angles substantially in line with the upper portions thereof, as shown at 20 and 21 respectively. The upper portions 14a and 15a of the legs 14 and 15 respectively, are normally substantially parallel and unflexed. The lower extremities of the legs 20 and 21 are deformed to form divergent inwardly facing claw-like jaws 22 and 23, respectively, adapted to grasp the neck of a canning jar or other container or article, by fitting under the peripheral bead thereof.

A second handle, hereinafter called the "pull handle," is positioned below and in parallel relationship with the handle 10 and is provided with vertical grooves 25 cut out of its extremities. The arms 14 and 15 register loosely in the grooves 25 and thus the handle 24 is slidable within the yoke formed by the cross member 13 and the arms 14 and 15.

A Y-shaped frame 12a of a material similar to that of the main frame 12, comprises a single length of material having a portion at its middle doubled back for a distance to form an elongated downwardly projecting apex 26, and has a pair of arms 27 and 28 extending angularly upward in Y-fashion for a distance. The extremities of the arms 27 and 28 are bent inwardly to form co-planar and aligned anchors which are imbedded in the ends of the pull handle 24, in recesses 37.

In normal condition, the pull frame 12a is positioned so that its projection 26 lies in the space 38 between the folds 18a and 19a of the main frame. A link 31, which may be of the same material as that of the main frame 12 and the pull frame 12a, passing through a hole 32 in the projection 26 of the pull frame and through the holes 33 and 34 of the main frame, connects the members 16, 18 and 17, 19 to the projection 26 in a pivotal manner, so that upward movement of the pull frame with respect to the main frame is transmitted to the main frame by means of the link 31, thus flexing upward the members 16 and 17 and also flexing outward in bow-like fashion the upper portions 14a and 15a of the legs 14 and 15, into the positions shown in Fig. 9. The flexing above described causes the lower ends 20 and 21 of the legs 14 and 15 to be deflected angularly inward, thus driving the jaws 22 and 23 in a direction toward each other, in an obvious manner, as shown in Fig. 9. In this operation the juxtaposed ends of the members 16, 18 and 17, 19 slide on the curved ends of the link 31.

In using the jar lifter, the user places the jaws in a position approximately below the bead 35 on the neck of the jar 36 and squeezes the handles 10 and 24 together, thereby driving the handle 24 slidably upward on the main frame 12 and contracting the jaws 22 and 23 as previously described in detail above. The jar so held may be carried safely to the location where it is to be set down, and release of the tension on the pull handle 24 allows the legs 14 and 15 to spring back into position and hence expand the jaws 22 and 23 so that the jar is released therefrom.

Obviously, modifications in form and structure may be made without departing from the spirit and scope of the invention.

I claim:

1. A device of the class described comprising a substantially yoke-shaped frame of resilient material having a handle member secured to the cross member thereof, the legs of the yoke having co-planar members extending inward toward each other intermediate the length of the legs, a second handle member slidably mounted on said legs between said first handle member and said co-planar members and parallel with said first handle member, the free extremities of said legs having opposed jaws thereon, and means connecting said second handle member with the juxtaposed ends of said co-planar members for raising said ends of said co-planar members upon moving said second handle member toward said first handle member and thereby causing those portions of said legs below said co-planar members to be flexed toward each other and consequently to bring said jaws closer together, the lengths of said co-planar members being such as to provide a space between the juxtaposed ends thereof, said means comprising a link pivotally joining said juxtaposed ends of said co-planar members, a V-shaped frame having the arms thereof anchored in said second handle member and having the apex thereof positioned between said second handle member and the plane of said co-planar members, said V-shaped frame having a projection from the apex thereof into said space, said link being secured to said projection.

2. A device of the class described comprising a yoke of resilient material substantially rectangular in outline, a handle member secured to the cross arm of the yoke, a second handle member having openings through the ends thereof positioned parallel to said first handle member and having the legs of said yoke register slidably in said openings, a substantially V-shaped frame member of resilient material having its extremities anchored in said second handle member and positioned between said legs in the plane of said yoke and extending in a direction opposite to the direction of the said first handle member, the lower portions of said legs being bent toward each other to lie normally at right angles to said legs, said lower portions of said legs having a length such that the extremities thereof lie spaced from each other thereby providing a space therebetween, the point of intersection of the arms of said V normally lying positioned adjacent but spaced above said space, said arms of said V having aligned openings therethrough adjacent said point of intersection, said lower portions of said legs having openings therethrough near their juxtaposed extremities and at right angles to said lower portions of said legs, a link extending through said aligned openings in said V, the ends of said link being curved and extending through said openings in said lower portions of said legs, said lower portions of said legs having spaced arms projecting downward therefrom, the lower extremities of said spaced arms having opposed jaws thereon.

ASA CLAYTON REECE.

REFERENCES CITED

The following references are of record in the file of this patent:

UNITED STATES PATENTS

| Number | Name | Date |
|---|---|---|
| 1,359,649 | Allison | Nov. 23, 1920 |